United States Patent
Kwon

(10) Patent No.: US 9,168,929 B2
(45) Date of Patent: Oct. 27, 2015

(54) SYSTEM AND METHOD FOR PROVIDING VEHICLE DRIVING INFORMATION

(71) Applicant: Hyundai Motor Company, Seoul (KR)

(72) Inventor: Gideok Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 59 days.

(21) Appl. No.: 14/142,865

(22) Filed: Dec. 29, 2013

(65) Prior Publication Data

US 2014/0277830 A1     Sep. 18, 2014

(30) Foreign Application Priority Data

Mar. 18, 2013   (KR) .................. 10-2013-0028855

(51) Int. Cl.
| | | |
|---|---|---|
| G06F 7/00 | (2006.01) | |
| B60W 50/14 | (2012.01) | |
| B60W 40/09 | (2012.01) | |
| G07C 5/08 | (2006.01) | |

(52) U.S. Cl.
CPC ............... *B60W 50/14* (2013.01); *B60W 40/09* (2013.01); *G07C 5/08* (2013.01); *B60W 2520/10* (2013.01); *B60W 2520/105* (2013.01); *B60W 2530/14* (2013.01); *B60W 2550/402* (2013.01)

(58) Field of Classification Search
CPC .... B60T 8/172; G07C 5/008; B60R 16/0231; B60R 16/0315; B60G 17/0195
USPC .......................................................... 700/1
See application file for complete search history.

(56) References Cited

U.S. PATENT DOCUMENTS

| | | | | |
|---|---|---|---|---|
| 8,160,811 | B2* | 4/2012 | Prokhorov | G08G 1/161 701/300 |
| 8,188,887 | B2* | 5/2012 | Catten | G06F 17/30241 340/425.5 |
| 8,260,491 | B2 | 9/2012 | Brighenti et al. | |
| 8,326,485 | B2* | 12/2012 | Hyde | G07C 5/008 701/36 |
| 2005/0131607 | A1* | 6/2005 | Breed | B60N 2/002 701/45 |
| 2007/0152804 | A1* | 7/2007 | Breed | B60N 2/2863 340/435 |
| 2008/0255888 | A1* | 10/2008 | Berkobin | G06Q 40/08 705/4 |
| 2009/0102277 | A1* | 4/2009 | Ezoe | B60T 7/22 303/22.1 |

(Continued)

FOREIGN PATENT DOCUMENTS

| | | |
|---|---|---|
| JP | 07-257222 | 10/1995 |
| JP | 2004-287856 A | 10/2004 |

(Continued)

OTHER PUBLICATIONS

NPL_GPS; Date:N/A.*

*Primary Examiner* — Ian Jen

(74) *Attorney, Agent, or Firm* — Mintz Levin Cohn Ferris Glovsky and Popeo, P.C.; Peter F. Corless

(57) ABSTRACT

A system and method for providing vehicle driving information are provided. The method includes receiving, by a controller, one or more status variables that indicate a driving pattern of a driver and determining whether the one or more input status variables are within a predetermined error range of a stored potential dangerous section status variable. In addition the method includes determining, by the controller, whether a warning message is output based on a present velocity of the vehicle when the one or more input status variables are within the predetermined error range of the stored potential dangerous section status variable.

6 Claims, 4 Drawing Sheets

(56) References Cited

U.S. PATENT DOCUMENTS

| | | | |
|---|---|---|---|
| 2009/0224942 A1* | 9/2009 | Goudy | G08G 1/164 340/905 |
| 2010/0045451 A1 | 2/2010 | Periwal | |
| 2010/0274435 A1* | 10/2010 | Kondoh | B60W 40/09 701/31.4 |
| 2011/0060496 A1* | 3/2011 | Nielsen | G06Q 10/0631 701/31.4 |
| 2011/0254676 A1* | 10/2011 | Marumoto | G07C 5/085 340/441 |
| 2012/0109418 A1* | 5/2012 | Lorber | G06Q 10/00 701/1 |
| 2012/0146809 A1* | 6/2012 | Oh | G08G 1/205 340/901 |
| 2012/0283942 A1* | 11/2012 | T'Siobbel | G01C 21/26 701/410 |

FOREIGN PATENT DOCUMENTS

| | | |
|---|---|---|
| JP | 2006293683 A | 10/2006 |
| JP | 2012-190398 A | 10/2012 |
| KR | 10-1997-0037688 | 7/1997 |
| KR | 10-2003-0001619 | 1/2003 |
| KR | 10-2010-0079054 | 7/2010 |
| KR | 10-2010-0104616 | 9/2010 |
| KR | 10-2012-0007232 | 1/2012 |
| KR | 10-2012-0058074 | 6/2012 |

* cited by examiner

SYSTEM AND METHOD FOR PROVIDING VEHICLE DRIVING INFORMATION

CROSS-REFERENCE TO RELATED APPLICATION

This application claims priority to and the benefit of Korean Patent Application No. 10-2013-0028855 filed in the Korean Intellectual Property Office on Mar. 18, 2013, the entire contents of which are incorporated herein by reference.

BACKGROUND (a) Field of the Invention

The present invention relates to a system and method for providing vehicle driving information, and more particularly, to a system and method for providing vehicle driving information that determine and warn a driver of an accident risk by analyzing a driving pattern of the driver.

(b) Description of the Related Art

In recent years, various devices that support safe driving have been mounted within a vehicle. For example, various active safety systems including an anti-lock brake system (ABS), a traction control system (TCS), an electronic stability control (ESC), and the like have been developed. Further, a broad concept safety system has been studied, such as an advanced driver assistance system (ADAS) that performs functions such as front collision avoidance, blind spot monitoring, and the like using various sensors and imaging equipment mounted on the vehicle. However, when only the existing ADAS is used, only information on a vehicle, which is being driven, is collected and provided to a driver, and as a result, it may be difficult to provide information in consideration of a driving pattern of the driver.

As a repetitive pattern is formed, the driving pattern of the driver is changed accordingly to a repetitive pattern. Under such an environment, repetitive rapid deceleration may occur for a predetermined time and at a predetermined place while driving. For example, when other vehicles are driven or pedestrians in a specific zone are present on a route of a vehicle that is driven in a narrow alley in the specific time zone, rapid deceleration may occur. Further, when there is vehicle congestion, vehicles may not be viewed by the driver when the driver turns right at a specific crossroad and rapid deceleration may occur. Since such a situation is not shown in a navigation system, it may be difficult to determine the situation in response to the driving pattern of the driver.

The above information disclosed in this section is only for enhancement of understanding of the background of the invention and therefore it may contain information that does not form the prior art that is already known in this country to a person of ordinary skill in the art.

SUMMARY

The present invention provides a system and a method for providing vehicle driving information that determine and warn a driver of a potential dangerous area in which there is a risk of an accident by analyzing a driving pattern of the driver.

An exemplary embodiment of the present invention provides a method for providing vehicle driving information and may include: receiving one or more status variables indicating a driving pattern of a driver; determining whether one or more input status variables are within a predetermined error range of a stored potential dangerous section status variable; and determining whether a warning message is output to the driver based on a present velocity of the vehicle when one or more input status variables are within the predetermined error range of the stored potential dangerous section status variable. The one or more status variables may include at least one of the vehicle position, a present time, a time after an engine starts, and a time until the engine starts after stopping.

The stored potential dangerous section status variable may be stored by determining whether the vehicle is rapidly decelerated; storing one or more status variable at the rapid deceleration occurrence time of the vehicle, a vehicle velocity $V_P$ at a time just before the rapid deceleration occurrence time, and a vehicle velocity $V_F$ at a time just after the rapid deceleration occurrence time of the vehicle; retrieving a stored status variable; and storing one or more status variable, which are within an error range, as the potential dangerous section status variable when at least one of one or more status variables of the rapid deceleration occurrence time of the vehicle is within the predetermined error range of the retrieved status variable. The one or more stored status variables may be deleted after a predetermined time period has elapsed.

In determining whether the warning message is output to the driver based on the present velocity of the vehicle, the warning message may be output to the driver when the present velocity of the vehicle is higher than a set velocity $V_T$. The set velocity $V_T$ may be an intermediate value of the vehicle velocity $V_P$ at a time just before the rapid deceleration occurrence time of the vehicle and the vehicle velocity $V_F$ at a time just after the rapid deceleration occurrence time of the vehicle.

Another exemplary embodiment of the present invention provides a system for providing vehicle driving information and may include: a vehicle speed sensor configured to measure a velocity of a vehicle; a navigation system configured to provide position and time information of the vehicle; a storage unit configured to store one or more status variables, the velocity of the vehicle, and a potential dangerous section status variable; an output unit configured to output a warning message for a potential dangerous section through a screen or a voice output; and a controller operated by a program set to execute the output unit based on the information received from the vehicle speed sensor and the navigation system.

DESCRIPTION OF SYMBOLS

Figure 1:
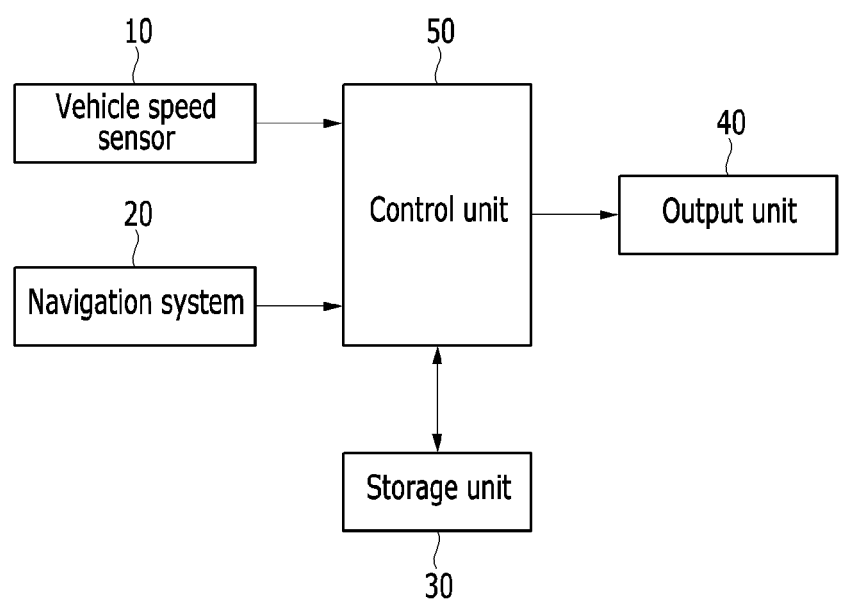
FIG. 1 is an exemplary block diagram illustrating a system for providing vehicle driving information according to an exemplary embodiment of the present invention.

10: Vehicle speed sensor
20: Navigation system
30: Storage unit
40: Output unit
50: Controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. However, the present invention is not limited to the exemplary embodiment described herein but embodied as another form.

FIG. 1 is an exemplary block diagram illustrating a system for providing vehicle driving information according to an exemplary embodiment of the present invention. Referring to FIG. 1, a system for providing vehicle driving information according to an exemplary embodiment of the present invention may include a vehicle speed sensor 10, a navigation system 20, a storage unit 30, an output unit 40, and a controller 50.

The vehicle speed sensor 10 may be configured to measure a velocity of a vehicle and transmit the measured velocity to the controller 50. The navigation system 20 may be configured to transmit position and time information of the vehicle to the controller 50. The navigation system 20 may be configured to calculate a longitude and latitude using a satellite signal to measure the position of the vehicle. At least one status variable and the velocity of the vehicle may be stored in the storage unit 30.

In the present specification, 'at least one status variable', which is information that indicates a driving pattern of a driver, may include at least one of the position of the vehicle, a present time, a time after an engine starts, and a time until the engine starts after the engine stops. In addition, a 'potential dangerous section' means a section in which rapid deceleration of the vehicle is anticipated. Further, a 'potential dangerous section status variable' means at least one status variable in the potential dangerous section.

The output unit 40 may be executed by the controller 50 and configured to output a warning message with respect to the potential dangerous section through a screen or a voice output. The output unit 40 may include an electronic map, a head up display (HUD), or a speaker. The controller 50 may be implemented by at least one microprocessor operated by a set program and the set program may include a series of commands for performing each step included in the method for providing vehicle driving information according to the exemplary embodiment of the present invention which will be described below.

Figure 2:
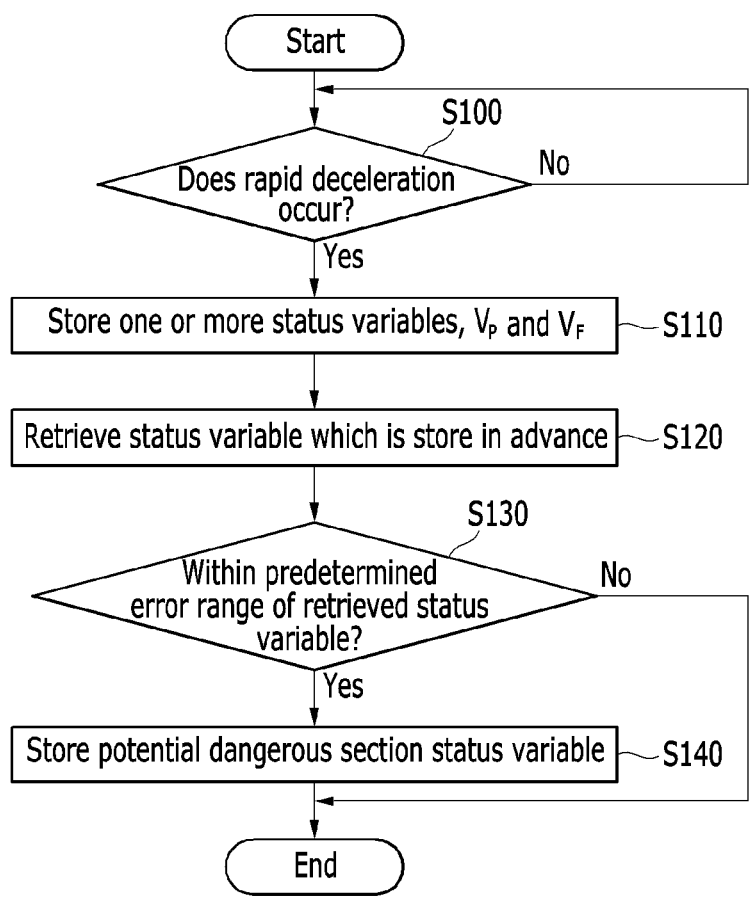
FIG. 2 is an exemplary flowchart illustrating a method for storing potential dangerous area status variables according to an exemplary embodiment of the present invention.
Figure 3:
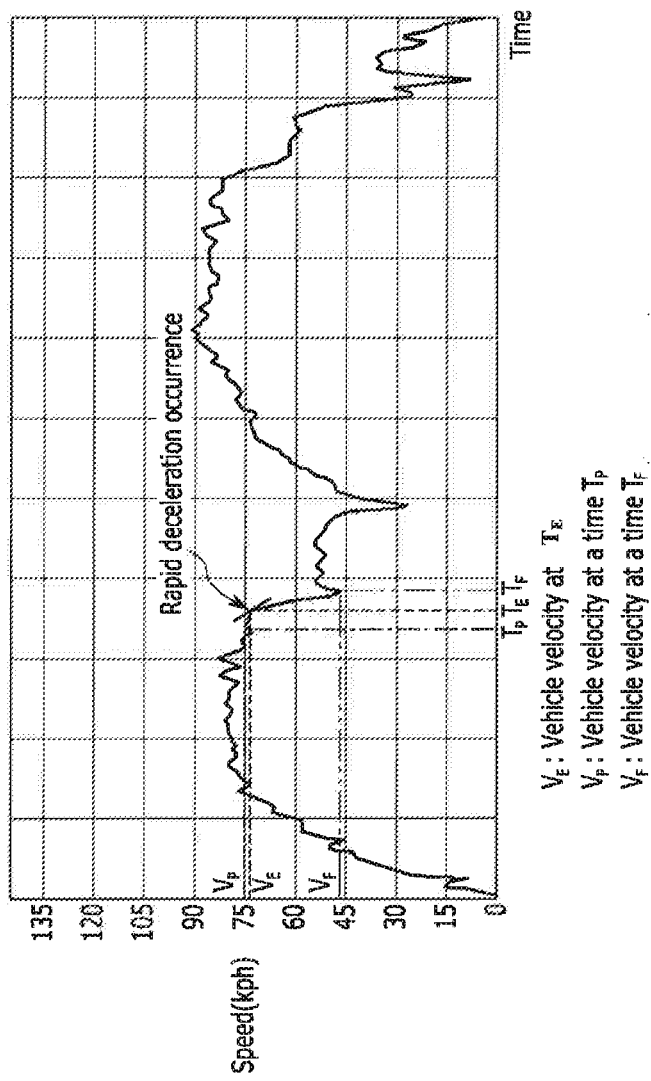
FIG. 3 is an exemplary graph illustrating a rapid deceleration occurrence situation of a vehicle according to an exemplary embodiment of the present invention.

FIG. 2 is an exemplary flowchart illustrating a method for storing potential dangerous section status variables according to an exemplary embodiment of the present invention. FIG. 3 is an exemplary graph illustrating a rapid deceleration occurrence situation of a vehicle according to an exemplary embodiment of the present invention. Referring to FIGS. 2 and 3, the controller 50 may be configured to first determine whether rapid deceleration occurs (S100).

Referring to FIG. 3, $T_E$ represents a rapid deceleration occurrence time, $T_P$ represents a time just before the rapid deceleration occurrence time, $T_E$ represents a time just after the rapid deceleration occurrence time, $V_E$ represents a vehicle velocity at the rapid deceleration occurrence time $T_E$, $V_P$ represents a vehicle velocity at the time $T_P$ just before the rapid deceleration occurrence time, and $V_E$ represents a vehicle velocity at the time $T_E$ just after the rapid deceleration occurrence time.

When the rapid deceleration occurs (S100), the controller 50 may be configured to store at least one status variable, the vehicle velocity $V_P$ at the time $T_P$ just before the rapid deceleration occurrence time, and the vehicle velocity $V_E$ at the time $T_E$ just after the rapid deceleration occurrence time (S110). Hereinafter, a case in which the rapid deceleration occurs on latitude of about 38.12555 and a longitude of about 128.34221 at about 3:55:41 p.m. will be described as an example.

Thereafter, the controller 50 may be configured to retrieve a predetermined status variable (S120). For example, it may be assumed that at least one status variable is stored as the rapid deceleration occurs on the latitude of 38.12561 and the longitude of 128.34221 at 8:32:24 a.m. four months ago. The controller 50 may be configured to determine whether at least one among one or more status variables at the rapid deceleration occurrence time of the vehicle is within a predetermined error range of the retrieved status variable (S130). The error range may be set in advance as an allowable error range in which the status variables may be determined to be substantially the same.

The latitude of 38.12555 and the longitude of 128.34221 at the rapid deceleration occurrence time of the vehicle are within the predetermined error range of the latitude of 38.12561 and the longitude of 128.34221 which are stored four months ago. Therefore, the latitude of 38.12555 and the longitude of 128.34221 at the rapid deceleration occurrence time of the vehicle may be stored as the potential dangerous section status variable as the position of the vehicle (S140). Further, the one or more status variables which are stored may be deleted after the set time period. Since storing the one or more status variables at all of the rapid deceleration occurrence time may cause a problem in reliability of the system, a predetermined time period is set which may be about six months.

Figure 4:
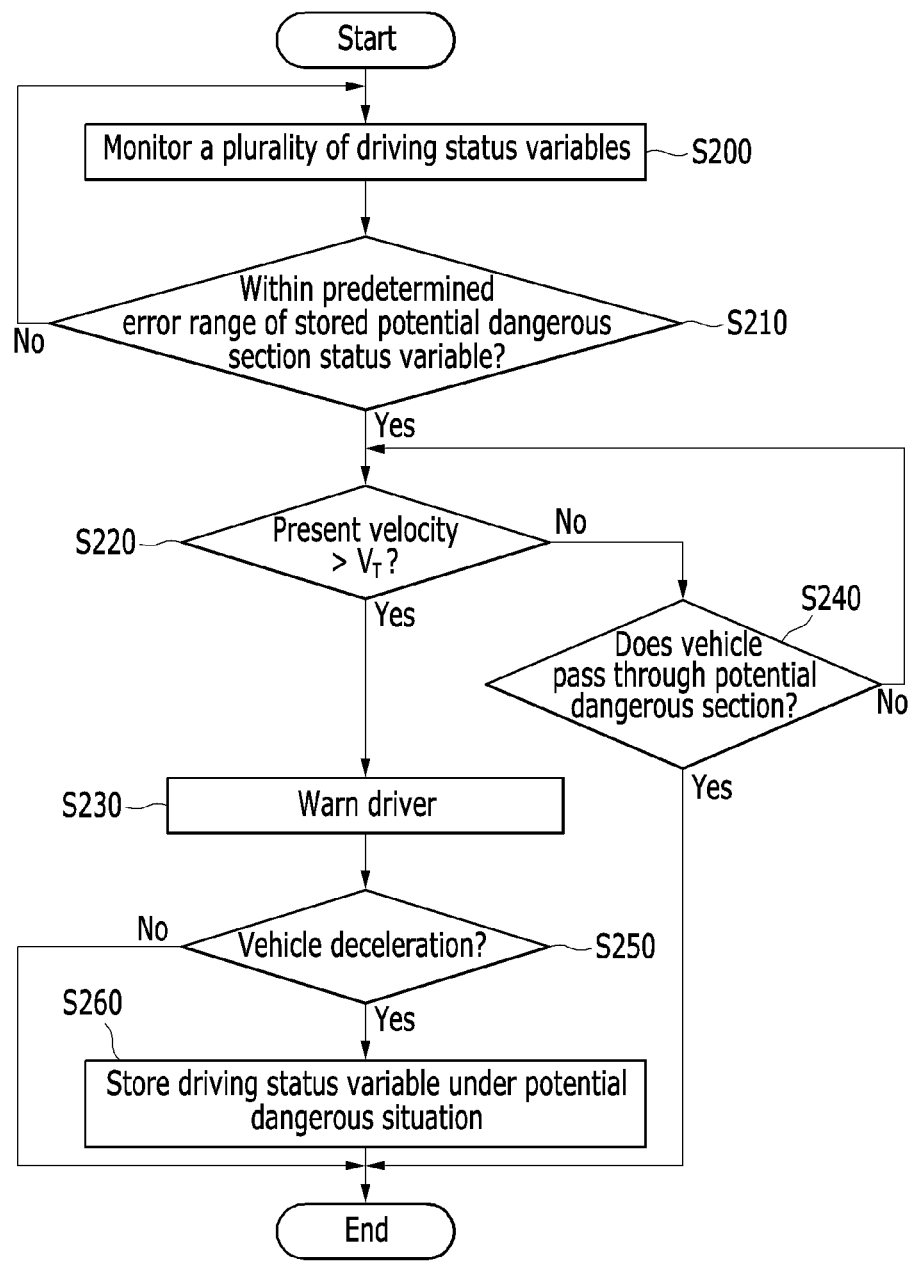
FIG. 4 is an exemplary flowchart illustrating a method for providing vehicle driving information according to an exemplary embodiment of the present invention.

FIG. 4 is an exemplary flowchart illustrating a method for providing vehicle driving information according to an exemplary embodiment of the present invention. Referring to FIG. 4, first, the controller 50 may be configured to monitor one or more status variables input from the vehicle speed sensor and the navigation system (S200). For example, it may be assumed that the vehicle is driven toward a region that corresponds to the latitude of 38.12556 and the longitude of 128.34221.

The controller 50 may be configured to determine whether one or more input status variables are within the predetermined error range of the stored potential dangerous section status variable (S210). When one or more input status variables are within the predetermined error range of the stored potential dangerous section status variable, the controller 50 may be configured to compare a present velocity of the vehicle and a set velocity $V_T$ with each other (S220). The latitude of 38.12556 and the longitude of 128.34221 are within the stored predetermined error range of the latitude of 38.12555 and the longitude of 128.34221. Therefore, the present velocity of the vehicle may be compared with the set velocity $V_T$.

In particular, when the present velocity of the vehicle is greater than the set velocity $V_T$, the controller 50 may be configured to output a warning message to the driver (S230). In other words, the controller may be configured to warn the driver of the potential dangerous section via a screen or voice to guide the driver to slow down the velocity of the vehicle. The set velocity $V_T$ may be an intermediate value of the vehicle velocity $V_P$ at the time just before the rapid deceleration occurrence time and the vehicle velocity $V_F$ at the time just after the rapid deceleration occurrence time.

When the present velocity of the vehicle is less than the set velocity $V_T$, the controller 50 may be configured to determine whether the vehicle passes through the potential dangerous section (S240). In particular, when the vehicle does not pass through the potential dangerous section, the controller 50 may be configured to compare the present velocity of the vehicle and the set velocity VT. The controller 50 may be configured to output the warning message to the driver and thereafter, determine whether the vehicle is decelerated within the potential dangerous section (S250). When the vehicle is decelerated within the potential dangerous section, the controller 50 may be configured to store one more input status variables which are within the set error range of the potential dangerous section status variable, as the potential dangerous section status variable (S260). Herein, a reference of the vehicle deceleration may be the set velocity $V_T$.

As described above, according to the exemplary embodiment of the present invention, the vehicle driving information that considers the driving pattern of the driver may be provided. Further, a potential dangerous situation may be determined in advance and warned to the driver, and as a result, safety and fuel efficiency may be improved by reducing a rapid deceleration situation of the vehicle. In addition, there is no burden in separate hardware installation by using the existing sensor and navigation system.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for providing vehicle driving information, comprising:

receiving, by a controller, one or more status variables indicating a driving pattern of a driver;

determining, by the controller, whether the one or more input status variables are within a predetermined error range of a stored potential dangerous section status variable; and determining, by the controller, whether a warning message is output based on a present velocity of the vehicle when the one or more input status variables are within the predetermined error range of the stored potential dangerous section status variable, wherein the one or more status variables are selected from at least one of a group consisting of: the position of the vehicle, a present time, a time after an engine starts, and a time until the engine starts after the engine stops, wherein the stored potential dangerous section status variable is stored by:

determining, by the controller, whether the vehicle is rapidly decelerated;

storing, by the controller, one or more status variable at the rapid deceleration occurrence time of the vehicle, a vehicle velocity $V_P$ at a time just before the rapid deceleration occurrence time, and a vehicle velocity $V_F$ at a time just after the rapid deceleration occurrence time of the vehicle;

retrieving, by the controller, a status variable which is stored in advance; and storing, by the controller, the one or more status variable, which are within an error range, as the potential dangerous section status variable when at least one of the one or more status variables of the rapid deceleration occurrence time of the vehicle is within the predetermined error range of the retrieved status variable, wherein in determining whether the warning message is output based on the present velocity of the vehicle, the warning message is output, by the controller, when the present velocity of the vehicle is greater than a set velocity $V_T$, and wherein the set velocity $V_T$ is an intermediate value of the vehicle velocity $V_P$ at a time just before the rapid deceleration occurrence time of the vehicle and the vehicle velocity $V_P$ at a time just after the rapid deceleration occurrence time of the vehicle.

2. The method of claim 1, wherein the one or more stored status variables are deleted after a set time period has elapsed.

3. A system for providing vehicle driving information, comprising:

a vehicle speed sensor configured to measure a velocity of a vehicle;

a navigation system configured to provide position and time information of the vehicle;

a storage unit configured to one or more status variables, the velocity of the vehicle, and a potential dangerous section status variable;

an output unit configured to output a warning message for a potential dangerous section through a screen or a voice output; and a controller configured to:
receive one or more status variables indicating a driving pattern of a driver;
determine whether the one or more input status variables are within a predetermined error range of a stored potential dangerous section status variable; and
determine whether a warning message is output based on a present velocity of the vehicle when the one or more input status variables are within the predetermined error range of the stored potential dangerous section status variable,
wherein the one or more status variables are selected from at least one of a group consisting of: the position of the vehicle, a present time, a time after an engine starts, and a time until the engine starts after the engine stops,
wherein the controller is further configured to:
determining whether the vehicle is rapidly decelerated;
storing one or more status variable at the rapid deceleration occurrence time of the vehicle, a vehicle velocity $V_P$ at a time just before the rapid deceleration occurrence time, and a vehicle velocity $V_F$ at a time just after the rapid deceleration occurrence time of the vehicle;
retrieving a status variable which is stored in advance; and
storing the one or more status variable, which are within an error range, as the potential dangerous section status variable when at least one of the one or more status variables of the rapid deceleration occurrence time of the vehicle is within the predetermined error range of the retrieved status variable,
wherein in determining whether the warning message is output based on the present velocity of the vehicle, the controller is configured to output the warning message when the present velocity of the vehicle is greater than a set velocity $V_T$, and
wherein the set velocity $V_T$ is an intermediate value of the vehicle velocity $V_P$ at a time just before the rapid deceleration occurrence time of the vehicle and the vehicle velocity $V_P$ at a time just after the rapid deceleration occurrence time of the vehicle.

4. The system of claim 3, wherein the one or more stored status variables are deleted after a set time period has elapsed.

5. A non-transitory computer readable medium containing program instructions executed by a controller, the computer readable medium comprising:
program instructions that receive one or more status variables indicating a driving pattern of a driver;
program instructions that determine whether the one or more input status variables are within a predetermined error range of a stored potential dangerous section status variable; and
program instructions that determine whether a warning message is output based on a present velocity of the vehicle when the one or more input status variables are within the predetermined error range of the stored potential dangerous section status variable,
wherein the one or more status variables are selected from at least one of a group consisting of: the position of the vehicle, a present time, a time after an engine starts, and a time until the engine starts after the engine stops,
wherein the stored potential dangerous section status variable is stored by:
program instructions that determine whether the vehicle is rapidly decelerated;
program instructions that store one or more status variable at the rapid deceleration occurrence time of the vehicle, a vehicle velocity $V_P$ at a time just before the rapid deceleration occurrence time, and a vehicle velocity $V_F$ at a time just after the rapid deceleration occurrence time of the vehicle;
program instructions that retrieve a status variable which is stored in advance; and
program instructions that store the one or more status variable, which are within an error range, as the potential dangerous section status variable when at least one of the one or more status variables of the rapid deceleration occurrence time of the vehicle is within the predetermined error range of the retrieved status variable,
wherein in determining whether the warning message is output based on the present velocity of the vehicle, the controller is configured to output the warning message when the present velocity of the vehicle is greater than a set velocity $V_T$, and
wherein the set velocity $V_T$ is an intermediate value of the vehicle velocity $V_P$ at a time just before the rapid deceleration occurrence time of the vehicle and the vehicle velocity $V_P$ at a time just after the rapid deceleration occurrence time of the vehicle.

6. The non-transitory computer readable medium of claim 5, wherein the one or more stored status variables are deleted after a set time period has elapsed.

* * * * *